(12) United States Patent
Augustine

(10) Patent No.: US 11,254,389 B2
(45) Date of Patent: Feb. 22, 2022

(54) OMEGA FLEX SWAY POD VEHICULAR APPARATUS

(71) Applicant: Kevin Thomas Augustine, Alakanuk, AK (US)

(72) Inventor: Kevin Thomas Augustine, Alakanuk, AK (US)

( * ) Notice: Subject to any disclaimer, the term of this patent is extended or adjusted under 35 U.S.C. 154(b) by 150 days.

(21) Appl. No.: 16/798,748

(22) Filed: Feb. 24, 2020

(65) Prior Publication Data
US 2021/0107596 A1      Apr. 15, 2021

Related U.S. Application Data

(60) Provisional application No. 62/914,808, filed on Oct. 14, 2019.

(51) Int. Cl.
*B62M 27/02*      (2006.01)

(52) U.S. Cl.
CPC ....... *B62M 27/02* (2013.01); *B62M 2027/026* (2013.01); *B62M 2027/028* (2013.01)

(58) Field of Classification Search
CPC .... B62D 24/04; B62D 33/0604; B62M 27/02; B62M 2027/026; B62M 2027/028
See application file for complete search history.

(56) References Cited

U.S. PATENT DOCUMENTS

| | | | |
|---|---|---|---|
| 3,136,378 A | | 6/1964 | Patee |
| 3,603,419 A | * | 9/1971 | Riddle .................. B62M 27/02 280/17 |
| 3,739,867 A | | 6/1973 | Drawe |
| 3,877,533 A | | 4/1975 | Maziarka et al. |
| 4,714,125 A | * | 12/1987 | Stacy, Jr. ............... B62D 11/22 180/182 |
| 5,014,805 A | * | 5/1991 | Uchida .................. B62M 27/02 180/184 |
| 10,144,383 B2 | | 12/2018 | Bodtker et al. |
| 2004/0262064 A1 | * | 12/2004 | Lefort .................... B62M 27/02 180/190 |

OTHER PUBLICATIONS

"Hammacher Schlemmer The Snowcraft", https://www.hammacher.com/product/snowcraft?PID=5314042&source=cj&utm_source=Affiliate&utm_medium=CPA&utm_campaign=CJ.

* cited by examiner

*Primary Examiner* — Minnah L Seoh
*Assistant Examiner* — Abigail R Hymel

(57) ABSTRACT

An omega flex sway pod vehicular apparatus, comprising a cockpit and a cantilever beam comprising a first and second ends. A cantilever beam stabilizer centrally coupled to the cantilever beam proximate to the first end. A beam stiffener coupled to a beam stiffener mount and the cantilever beam and positioned proximate to the cantilever beam stabilizer. A spring coupled to a spring mount and the cantilever beam and positioned proximate to the second end. The cockpit is a hollowed, ovoid-like shaped structure. The first end is coupled to a cantilever beam mount. The body is demountably coupled to the second end. The beam stiffener mount is coupled to a snowmobile tunnel that includes a left and right side. The cantilever beam mount and spring mount is coupled to the snowmobile tunnel. The cantilever beam mount is positioned proximate to the front side.

20 Claims, 10 Drawing Sheets

US 11,254,389 B2

OMEGA FLEX SWAY POD VEHICULAR APPARATUS

CROSS-REFERENCE TO RELATED APPLICATIONS

This application claims priority to U.S. Provisional Application No. 62/914,808 filed Oct. 14, 2019, which is hereby incorporated herein by reference.

FIELD OF THE INVENTION

The present disclosure relates generally to vehicular apparatuses. More specifically, the present disclosure describes omega flex sway pod vehicular apparatuses.

BACKGROUND OF THE INVENTION

Snowmobiles typically incorporate an open seat design which allows occupants to maneuver their weight to perform sundry maneuvers and control. During typical snowmobile operation, occupants shift or sway their weight directionally to create leverage and/or yaw and thereby steer the snowmobile to achieve counterbalance and maximum maneuverability. This is currently why the existing market and snowmobile manufacturers prefer the open seat design.

However, the open seat design is void of seat belts and various safety mechanisms (e.g., protection against high speed crashes, impact, etc.). Such vehicle offers no protection from environmental elements, such as extreme cold, blizzards, avalanches, water submersion, bright sun, etc. Furthermore, snowmobiles can come equipped with powerful engines and drive trains that enable occupants to reach speeds that can exceed 100 miles per hour. In an open seat design, such speeds can and do expose occupants to extremely dangerous and sometimes fatal conditions and situations. Snowmobiles may also operate in environments that can be hostile, dangerous, and/or fatal to occupants such as crevasses, avalanche areas, as well as similar environments.

BRIEF DESCRIPTION OF THE DRAWINGS

Some of the embodiments will be described in detail, with reference to the following figures, wherein like designations denote like members, wherein.

Figure 1:
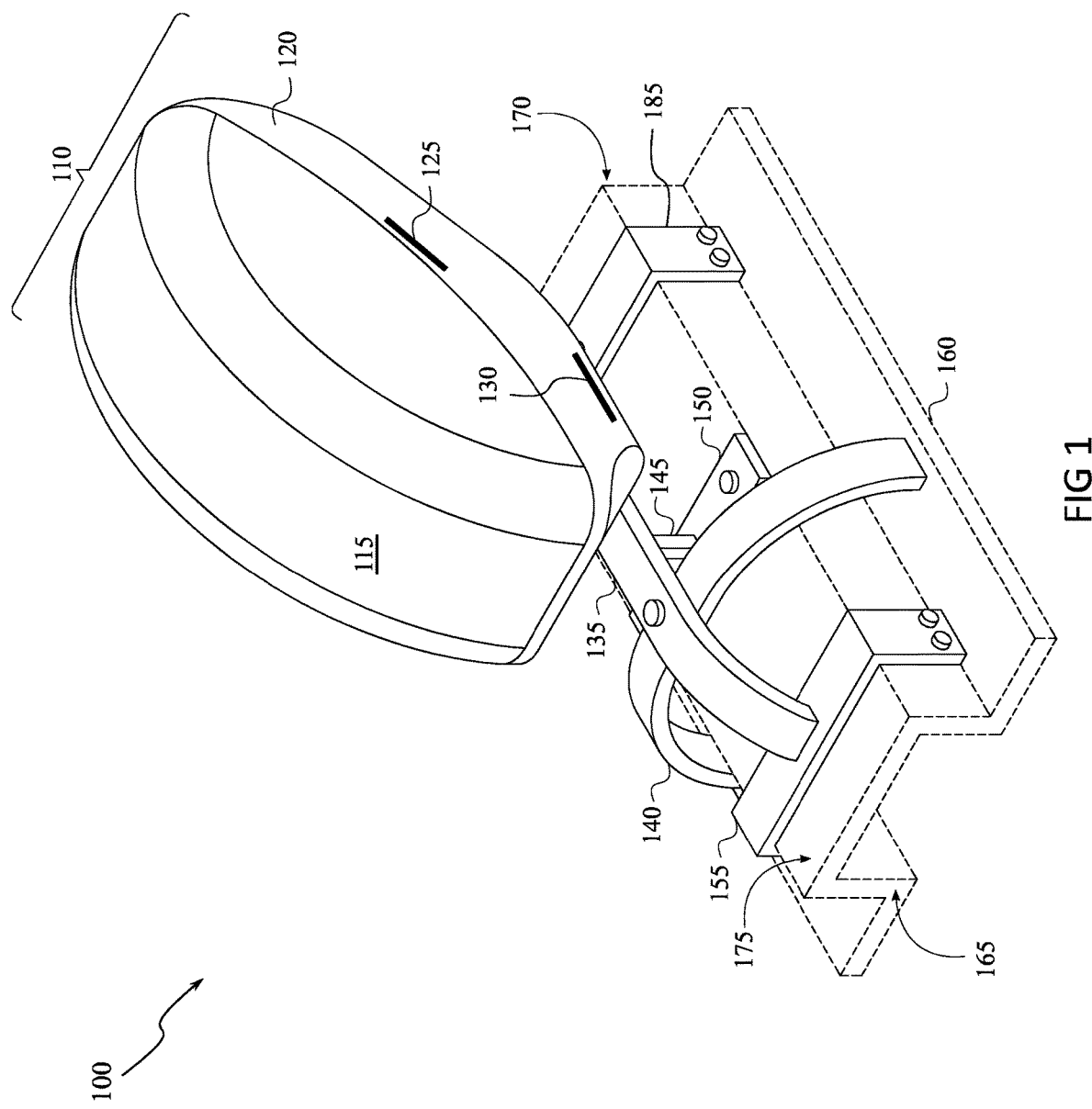
FIG. 1 illustrates a top front perspective view of the omega flex sway pod vehicular apparatus ("vehicular apparatus") according to some embodiments.
Figure 2:
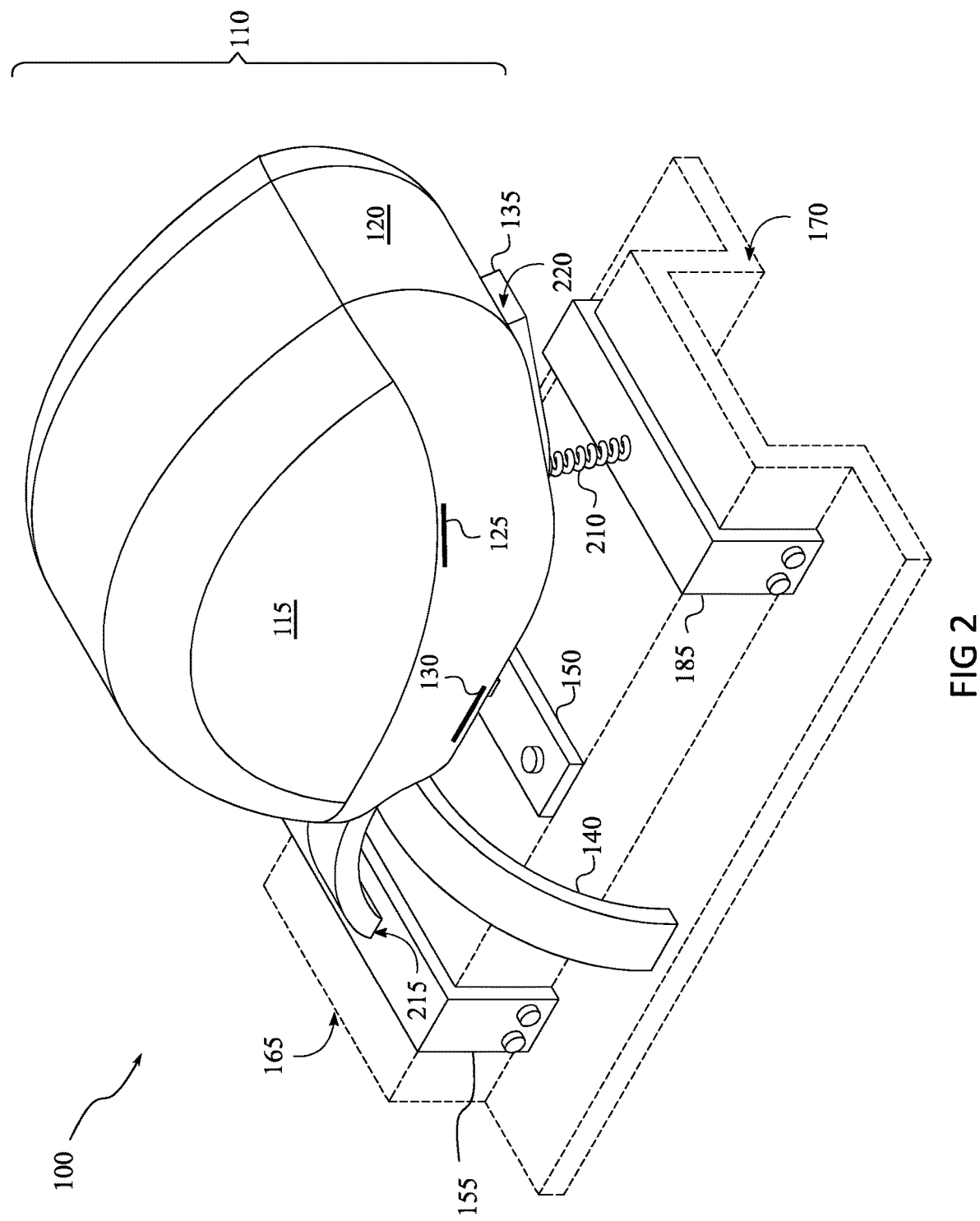
FIG. 2 illustrates a top rear perspective view of the vehicular apparatus according to certain embodiments.
Figure 3:
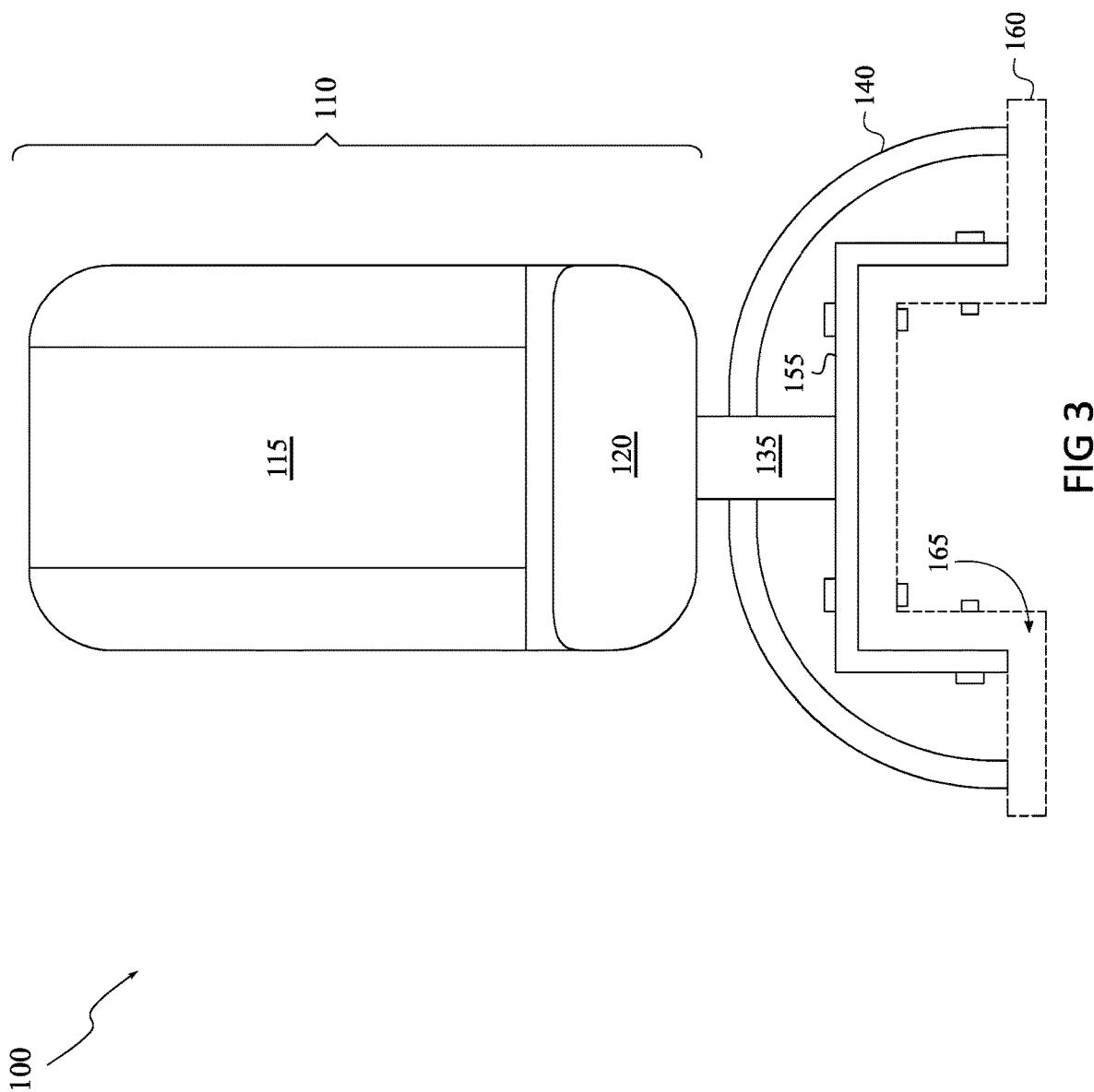
FIG. 3 illustrates a front view of the vehicular apparatus according to other embodiments.
Figure 4:
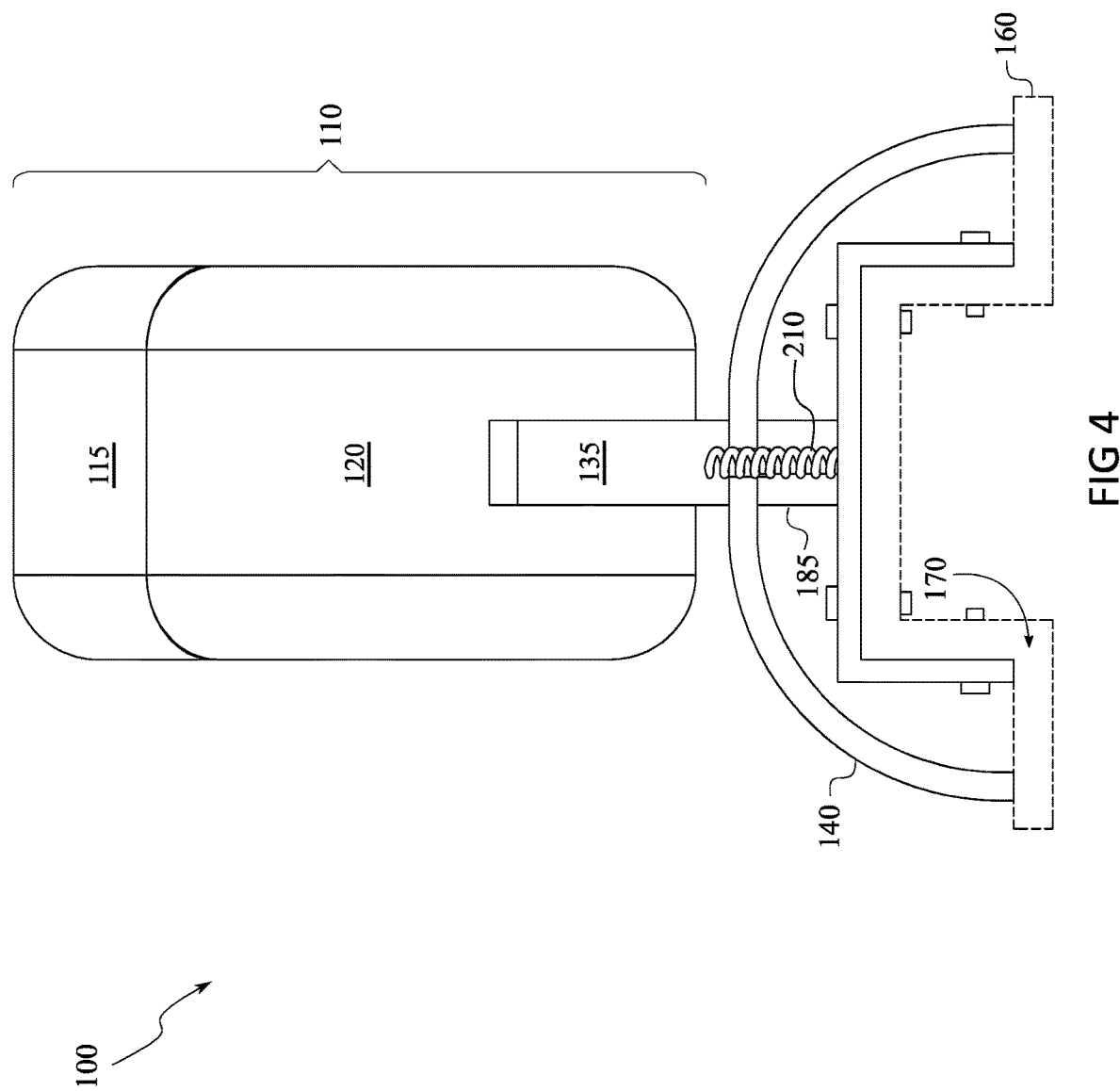
FIG. 4 illustrates a rear view of the vehicular apparatus according to other embodiments.
Figure 5:
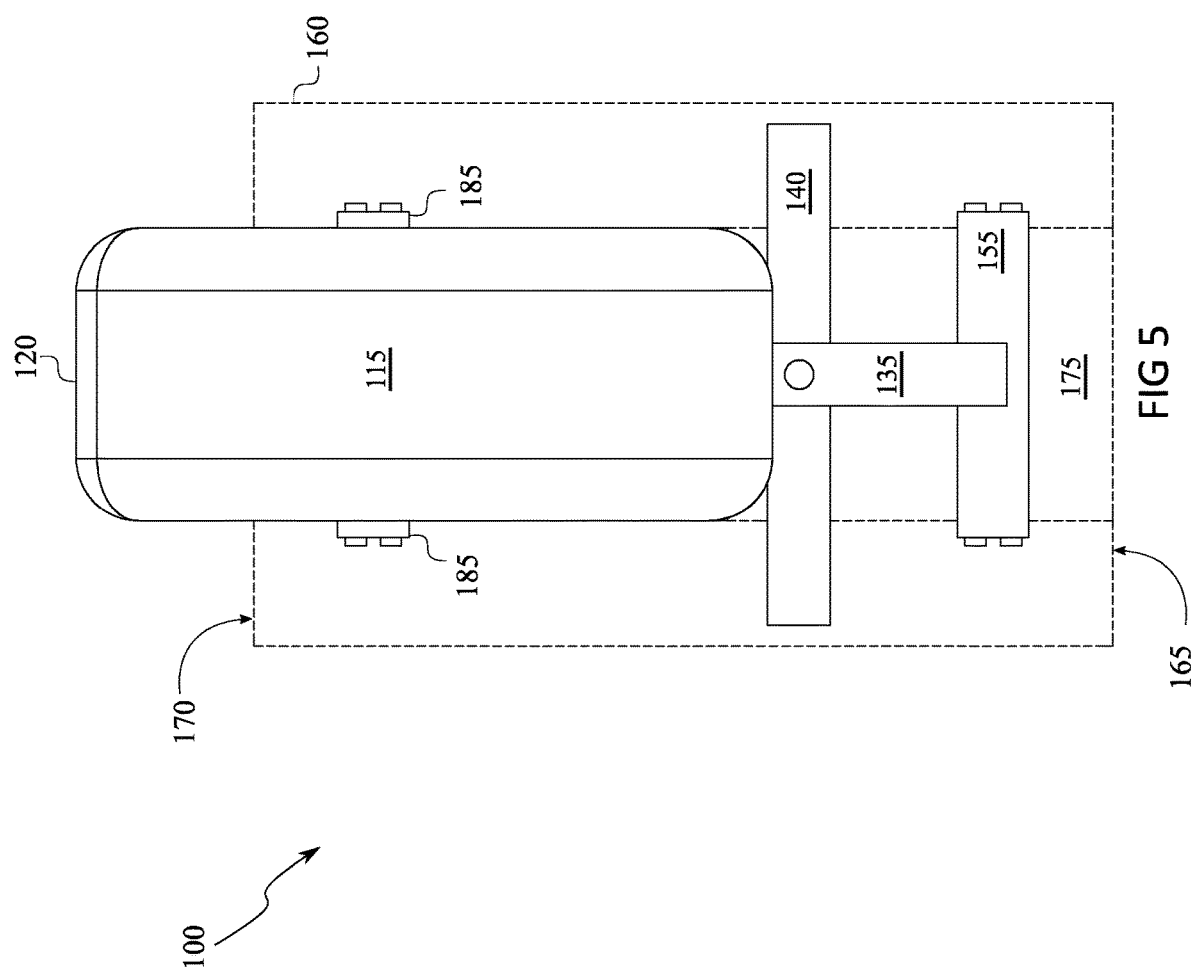
FIG. 5 illustrates a top view of the vehicular apparatus according to some embodiments.
Figure 6:
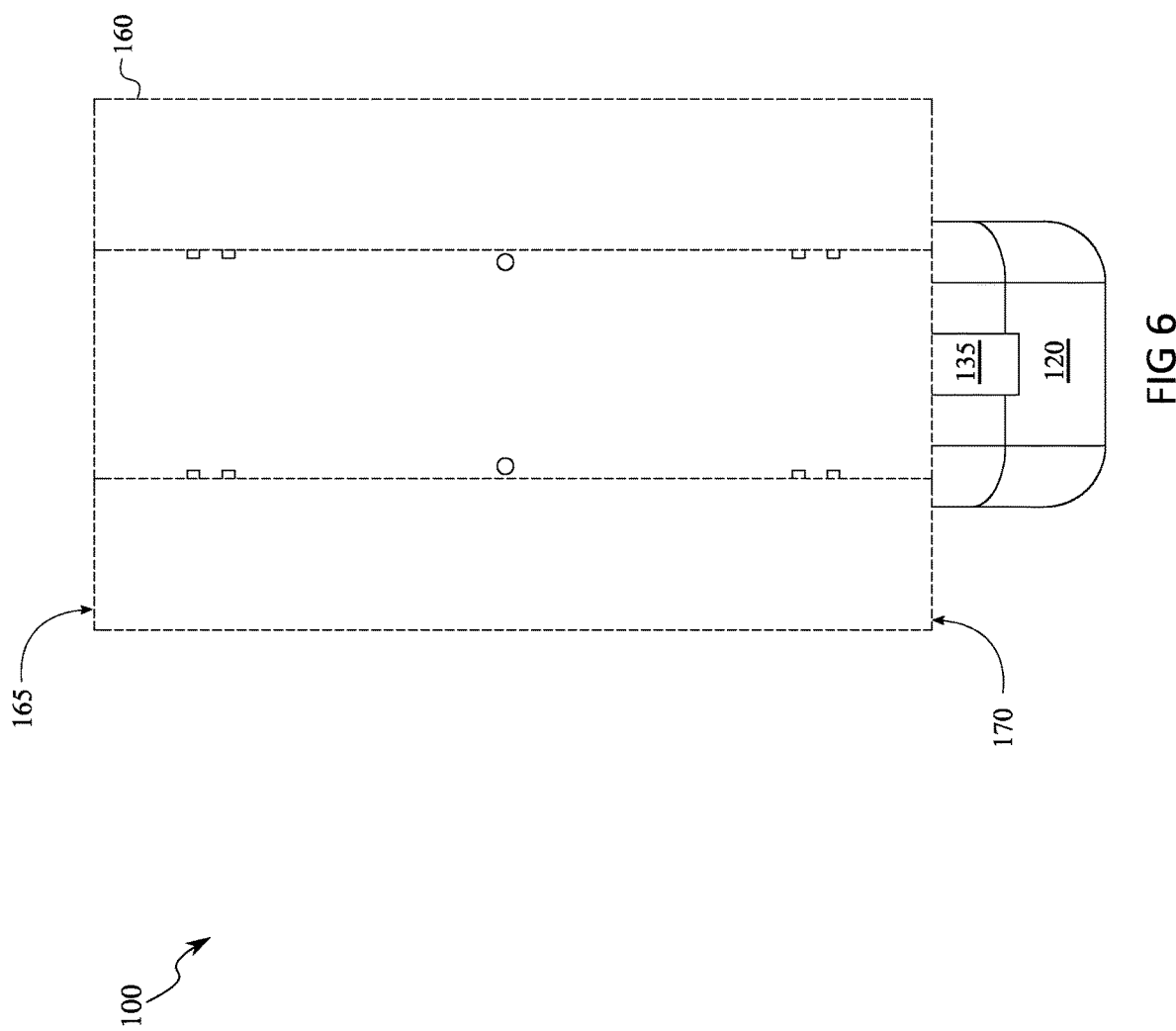
FIG. 6 illustrates a bottom view of the vehicular apparatus according to certain embodiments.
Figure 7:
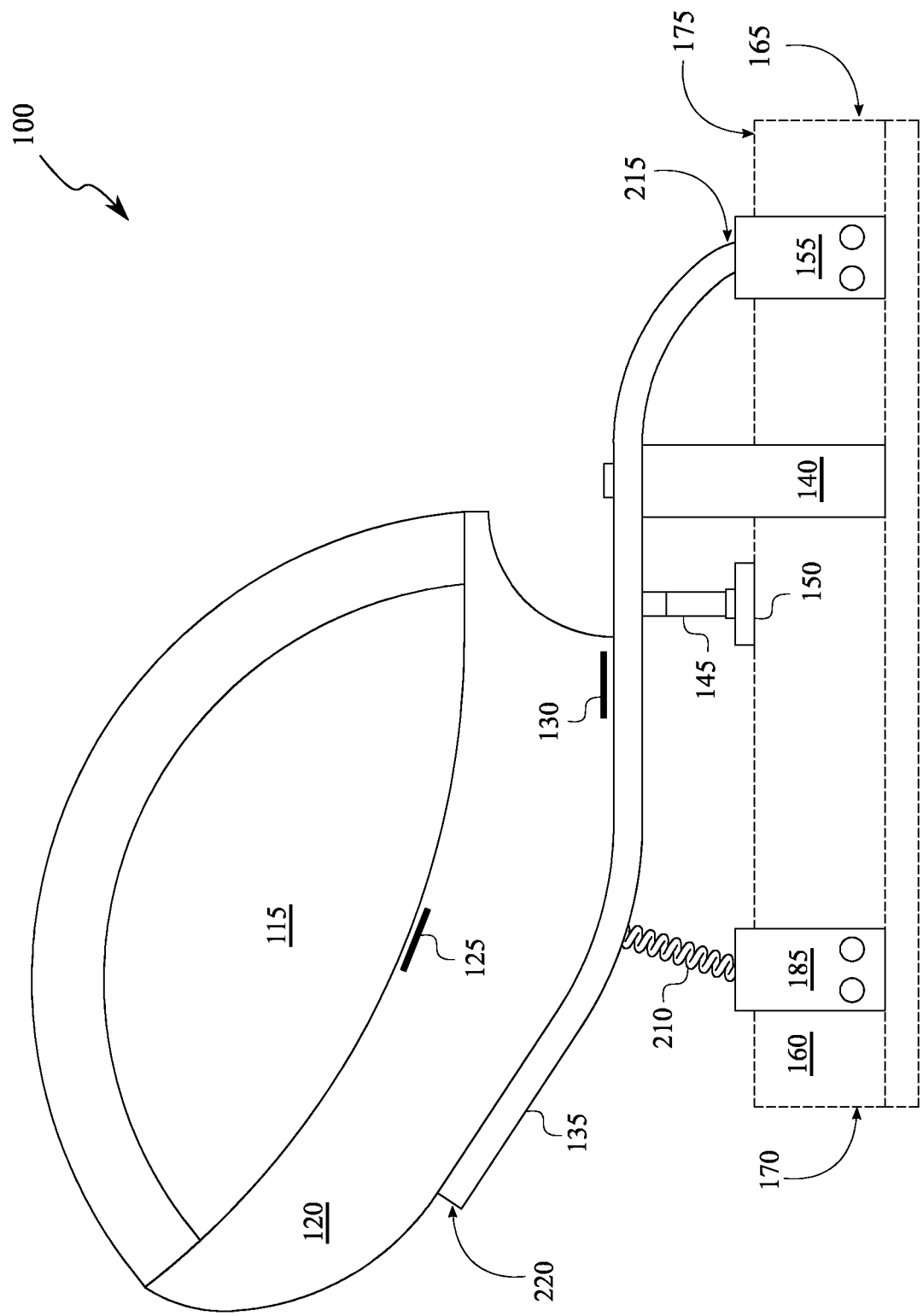
FIG. 7 illustrates a right-side view of the vehicular apparatus in the "closed" state according to other embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

As used herein, the term "metal" refers to steel, aluminum, alloys, copper, and/or similar metals typically used in the manufacture of vehicles. As used herein, the term "polymer" refers to polystyrenes, acrylics, polyimides, glass epoxies, ethylene-vinyl acetate, fluorinated ethylene propylene, high density polyethylene, low density polyethylene, fluoropolymers, polyethylene terephthalate, acrylonitrile butadiene styrenes, cellulose acetate butyrate, ethylene tetrafluoroethylene, similar high-impact plastics and/or combinations thereof. As used herein, the terms "occupant," "user," and "driver" are used interchangeably to refer to individuals that ride and maneuver modified snowmobiles described herein.

The present disclosure includes many aspects and features. Moreover, while many aspects and features relate to, and are described in the context of detection of presence of one or more intruder devices., embodiments of the present disclosure are not limited to use only in this context.

Snowmobiles typically incorporate an open seat design allows occupants to maneuver their weight to perform sundry maneuvers and control. During typical snowmobile operation, occupants shift or sway their weight directionally to create leverage and/or yaw and thereby steer the snowmobile to achieve counterbalance and maximum maneuverability. This is currently why the existing market and snowmobile manufacturers prefer the open seat design.

However, the open seat design is void of seat belts and various safety mechanisms (e.g., protection against high speed crashes, impacts, etc.). Such vehicle offers no protection from environmental elements, such as extreme cold, blizzards, avalanches, water submersion, bright sun, etc. Furthermore, snowmobiles can come equipped with powerful engines and drive trains that enable occupants to reach speeds that can exceed 100 miles per hour. In an open seat design, such speeds can and do expose occupants to extremely dangerous and sometimes fatal conditions and situations. Snowmobiles may also operate in environments that can be hostile, dangerous, and/or fatal to occupants such as crevasses, avalanche areas, as well as similar environments.

Referring now to FIGS. 1-7. Embodiments disclosed herein seek to disclose an omega flex sway pod vehicular apparatus ("the pod"), generally 100, that can be affixed to a snowmobile's tunnel. In general, the pod 100 can be of and/or include therein any shape, size, material, features, type or kind, orientation, location, quantity, components, and arrangements of components that would fulfill the objectives and intents of the instant disclosure. However, it is preferred that materials used to fabricate the pod 100 be of light weight (e.g., a weight that will result in no more than a 20% reduction in snowmobile's torque, top speed, acceleration rate, etc.), strong, durable, tough, impact resistant, weather resistant, not susceptible to extreme temperature and/or weather conditions and/or easily manufacturable. The pod 100 is preferably optimized for use in sub-zero weather or cold conditions worsened by wind chill, with strong forced-air heating and a windshield designed to be kept clear of internal and external ice or condensation through a variety of means, such as, for example, advanced coatings, external scrapers (e.g., windshield wipers of a modified type), and/or internal ducts blowing hot air on the surface. In some embodiments, the pod 100 is mounted on to a conventional snowmobile's tunnel (e.g., snowmobile tunnel 160) during the manufacturing process.

For example, applicable design modifications to conventional snowmobiles may include, but are not limited to: seat removal; gas tank relocation (e.g., proximate to the footrests); redesigning the airbox to accommodate the cantilever mount; adding connections to the handle bar controls (e.g., electrical, brake/throttle cables); and converting the standard steering post and handle bar to a drive-by-wire mechanism (e.g., which facilitates an unobstructed detachment/reattachment of the cockpit 110).

The pod 100 is a completely enclosed, warm, sporty, lightweight, aerodynamic, safe, strong, water-tight, buoyant, and detachable survival pod. To maneuver snowmobiles that incorporate the pod 100, occupants use their weight to shift or sway the pod 100 to either side and create leverage as well as increase control/maneuverability and thereby duplicate the mode of operation of typical open seat snowmobile designs known in the art.

In other embodiments, the pod 100 is retrofitted on to the tunnel of a snowmobile (e.g., tunnel 160). In other embodiments, the pod 100 is added to the snowmobile tunnel 160 during the manufacture of the associated snowmobile. As discussed further below, other than the steering mechanism, the pod 100 can be incorporated onto snowmobiles with relatively minimum modification(s); specifically the following would require a redesign: the cowling, gas tank, air box, steering post, wiring and cables (connected to the handle bar). In general, the pod 100 is a strategically mounted and cantilevered enclosed hollow structure. The pod 100 includes a cockpit 110 for occupants to sit in and operate the snowmobile. In general, the cockpit 110 can be of any shape, type or kind; and/or include any feature, material, orientation, component, or arrangement of components that would facilitate fulfillment of the objectives and intents of the instant disclosure. The cockpit 110 is preferably lightweight, aerodynamic, impact resistant, buoyant, and at least partially transparent. It is preferred that the canopy 115 is transparent and the body 120 is at least partially transparent. For example, transparency of the body 120 allows the occupant to view the snowmobile tunnel 160 as well as the ambient environment from within the cockpit 110.

The cockpit 110 is preferably a hollowed, ovoid-like shaped figure that an adult-sized user can comfortably fit within in a reclined sitting position. Although many seating arrangements are possible, the reclined sitting position affords the occupant the ability to use leverage to maneuver the snowmobile while not increasing the center of gravity of the snowmobile. Hence, seating arrangements that result in a higher center of gravity should be avoided as they increase the probability that the snowmobile will roll over. The cockpit 110 protects users against, for example, extreme weather conditions (e.g., below 0° F.), cold temperatures (e.g., between 0-32° F.), water, hail, blizzard conditions and a sundry of potentially hazardous conditions and situations according to certain embodiments. For example, the cockpit 110 can include insulating material.

In some embodiments, the cockpit 110 consists of at least two components (e.g., canopy 115 and body 120) pivotably attached, for example, by a hinge that opens and closes. Hence, the cockpit 110 includes an "open" state and a "closed" state, depicted in FIGS. 9 and 10, respectively. In the "closed" state, the canopy 115 is rotated towards the body 120 to form a hallow enclosure. In the "open" state, the canopy 115 is rotated away from the body 120 to expose the contents of the cockpit 110 (discussed further below). The cockpit 110 preferably includes a latch 125, for example, secured to the outer surface of the cockpit 110 to prevent the component from inadvertently transitioning to the "open" state when impacted or undergoing similar events. The hinge is preferably mechanical bearing that couples two components together and allows a limited angle of rotation between them. For example, an end of the body 120 (e.g., the rear end) can be pivotally affixed to an end of the canopy 115 (e.g., the rear end).

The latch 125 is preferably a mating mechanical device that demountably couples the canopy 115 and the body 120 together when the cockpit 110 is in the closed state. For example, the latch 125 can be can include one or more metals and/or polymers. In certain embodiments, the hinge is spring-loaded such that the canopy is flipped open to allow access to the cockpit 110. The canopy 115 is preferably a transparent enclosure to allow for an expanded field of view. In certain embodiments, the canopy 115 is tinted to shape the occupants as well as improve visibility on bright and sunny days. For example, the canopy 115 has a window tint value of 95%-10% VLT (visible light transmission). The shape of the canopy 115 is preferably configured to minimize aerodynamic drag, while maximizing visibility for occupants. In some embodiments, the canopy 115 includes pieces of glass or plastic held in position by a frame and muntins. In other embodiments, the canopy 115 is fabricated as a single piece of glass or plastic.

The canopy 115 and/or the body 120 is preferably fabricated using high impact materials. For example, the canopy 115 and/or the body 120 can be formed using a polymer material. The canopy 115 and/or the body 120 can include double, triple, or quadruple glazing/panes where panes are separated by a vacuum or gas-filled space to reduce heat transfer across the component. The cockpit 110 is of a general shape similar to a hollowed, ovoid-like shaped figure. It can be preferred that the size of the cockpit 110 accommodate an adult-sized occupant/occupant comfortably in a reclined sitting position. The body 120 includes a step 130 positioned on the exterior of the body 120 to facilitate ingress to and egress from the cockpit 110. In some embodiments, the step 130 protrudes from the exterior of the body 120. In other embodiments, the step 130 is a depression within which a foot may be placed. Although the step 130 can be positioned anywhere on the body 120, the step 130 is preferably positioned on a side of the body 120 proximate to the snowmobile tunnel 160. In some embodiments, the step 130 is formed using one or more metals and/or polymers. User visibility is paramount to properly and safely maneuver the modified snowmobile. For example, the cockpit 110 can include one or more side-view mirrors affixed thereto that provide the occupants a view of the area behind and on the sides thereof. In yet still other embodiments, the cockpit 110 can include at least one rear-facing camera communicatively coupled to a monitor located within the cockpit 110 to provide the occupants a view of the area behind and on the sides thereof.

The cockpit 110 preferably includes a plurality of essential amenities and instrumentation with respect to weight and efficiency. For example, the plurality of amenities can be of any shape, size, type or kind, orientation, location, quantity, as well as include any components and/or arrangements thereof that would allow the pod 100 to fulfill the objectives and intents of the instant disclosure. However, the plurality of amenities are preferentially positioned within the cockpit 110. The plurality of amenities preferentially include features that are commonly associated with vehicle cabins; such as, but not limited to, secure consoles, climate control systems, seat harness systems, adjustable foot rest with stirrup-like design, roll bar, detachment handles, LED interior lighting, DC car lighter plug in, GPS mount, oxygen tank and other similarly related objects. It can be preferred that an AC exterior plug-in be incorporated outside the pod 100 to provide unlimited power to the heating system while initially warming up the cockpit 110.

Figure 8:
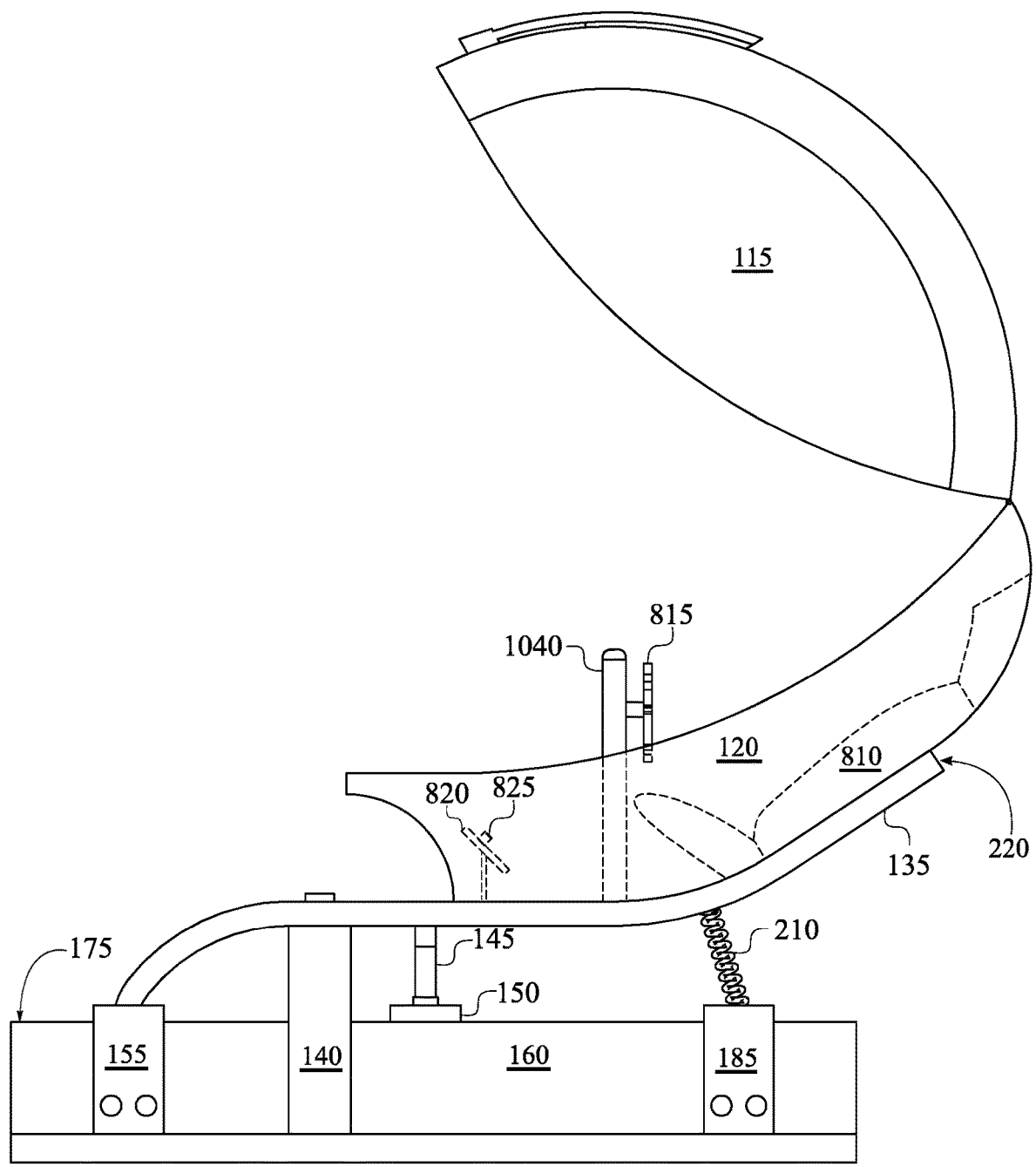
FIG. 8 illustrates a left-side view of the vehicular apparatus in the "open" state according to other embodiments.

FIG. 8 illustrates a side view of the pod 100 in the "open" state according to certain embodiments. Although various positions are applicable, the reclined position of seat 810 preferably positions the footrest 820 substantially level with the bottom of the seat 810. The seat 810 can include of one or more metals and/or polymers according to certain embodiments. For example, the seat 810 may or may not include padding (e.g., feathers and/or foams). The footrest 820 can include one or more metals and/or polymers. The thigh-body angle of the seat 810 is preferably at least 150 degrees, which reduces the center of gravity of the pod 100. To be sure, one of the important aspects to consider when choosing seating is the angle the seat will place between thighs and the upper body. A thigh-body angle of at least 150 degrees is preferred herein as it reduces pressure on the spine.

Not to be limited by theory, a thigh-body angle of at least 150 degrees allows the occupant's spine to assume its natural 'S' shaped position. The occupant is preferably secured to the 810 by a multi-point harness 910. For example, the multi-point harness 910 can be a two- to eight-point harness known in the art. It is preferred that the general exterior shape of the cockpit 110 conforms to the general shape of an adult occupant in a reclined seating position with aerodynamic features to allow for a lightweight, compact and efficient design that reduces wasted and/or unused space.

The cockpit 110 is dynamically coupled to the snowmobile tunnel 160 via various components. To be sure, snowmobile tunnels (e.g., snowmobile tunnel 160) is typically formed used one or more metals. To begin, the snowmobile tunnel 160 includes a front side 165 and a back side 170, wherein the front side 165 and back end 170 are typically oriented towards the front end and back end, respectively, of the snowmobile. The cockpit 110 is preferably affixed to top side 175 of the snowmobile tunnel 160 via three (3) mounts that can, for example, be bolted, welded, and/or bonded thereto. For example, a cantilever beam mount 155 is affixed to the top side 175 proximate the front side 165 and a spring mount 185 is affixed to the top side 175 proximate to the back side 170. The cantilever beam 135 is preferable to heavy duty metal leaf springs commonly found in conventional trucks. The cantilever beam 135 is a steel leaf spring or multiple layered leaf springs (as found in vehicle suspension systems) according to preferred embodiments. A beam stiffener mount 150 is affixed to the top side 175 and positioned between the cantilever beam mount 155 and the spring mount 185. The beam stiffener mount 150 is formed using one or more metals.

A cantilever beam 135 includes a first end 215 and a second end 220. The cantilever beam 135 is preferably elastic, flexible, and/or shape-memory retentive. It can be preferred that the cantilever beam 135 be of a type or kind such that the cantilever beam 135 can be similar to a heavy duty, curved leaf spring and other such objects found in heavy duty truck suspension systems and such. In some embodiments, the cantilever beam 135 is a curved, quadrilateral-like shaped beam that supports the cockpit 110 and its occupant(s). For example, the front end 215 is preferably thicker than the second end 220. The front end 215 is centrally affixed to the cantilever beam mount 155. It can be preferred that the second end 220 is positioned adjacent to the top side 175 adjacent to the back side 170. The second end 220 is preferably affixed to the cockpit 110. In some embodiments, the cockpit 110 is demountably coupled to the cantilever beam 135 via the second end 220.

The cockpit 110 is preferably configured for safety and survivability. For example, the cockpit 110 is preferably water-tight to provide buoyancy in case of submersion, blizzard, avalanche or any situation that requires the cockpit 110 watertight. For example, the cockpit 110 can include a dynamic mounting mechanism that allows for complete, clear, and unobstructed detachment of the cockpit 110 from the cantilever beam 135, for example, in the event of a roll-over, submersion, avalanche or any situation that requires cockpit detachment. It can be preferred that such mechanism, which can be either electronic or mechanical, be incorporated between the cockpit 110 and cantilever beam 135 thereby enabling the occupant or occupant to engage the detachment mechanism remotely from inside the cockpit 110. In some embodiments, rubber dampers may be affixed to the mount between the body 120 of the pod and the second end of the cantilever beam 135 to reduce vibration from the snowmobile thereby allowing for a smoother ride. To achieve the optimum effect of replicating a conventional open seat snowmobile design, where the occupant either sits or stands while operating the snowmobile, it is preferred that the cantilever beam mount 155, the cantilever beam stabilizer 140, and the beam stiffener mount 150 be affixed proximate to the front side 165 as opposed to the back side 170.

The first end 215 is preferably affixed to the cantilever beam mount 155. The body 120 is preferably demountably coupled to the second end 220. The cantilever beam stabilizer 140 is preferably centrally coupled to the cantilever beam 135 proximate to the first end 215. The cantilever beam stabilizer 140 is preferably positioned between the cantilever beam mount 155 and the beam stiffener mount 150. The cantilever beam stabilizer 140 is formed using one or more shape memory retentive metal(s) according to preferred embodiments. In some embodiments, the beam stabilizer is comprised of a single, flat, flexible steel leaf spring-like material. The beam stiffener mount 150 is formed using one or more metals. In some embodiments, the bottom ends of the cantilever beam mount 155 are affixed to the lowest part of the snowmobile tunnel 165 close to the footrest. This creates a lower center of gravity for the pod. The cantilever beam stabilizer 140 is preferably positioned perpendicular to the cantilever beam 135 to provide the maximum support thereto. The cantilever beam 135 is positioned centrally and longitudinally relative to the top side 175.

To provide additional support, beam stiffener 145 is coupled to the beam stiffener mount 150 and the cantilever beam 135 proximate to the cantilever beam stabilizer 140. The beam stiffener 145 is formed using one or more metals according to preferred embodiments. In some embodiments, the beam stiffener 145 is a solid elongated structure configured to support a portion of the combined weight of the cantilever beam 135, the cockpit 110, and the occupant of the pod 100. However, the beam stiffener 145 preferably includes a telescoping pole or rod that engages the bottom surface of the cantilever beam 135 when the cockpit 110 dips below the line of sight of the occupant while seated in the present invention.

The beam stiffener 145 is affixed to the stiffener mount 150 proximate to the forward section of the snowmobile tunnel giving the pod and user some upward leverage to the front end of the snowmobile. In general, the beam stiffener 145 provides dynamic or variable upward leverage to the cockpit 110. In certain embodiments, the beam stiffener 145 is preferably positioned between the top surface 175 and the bottom surface of the cantilever beam 135. In certain embodiments, the beam stiffener 145 is positioned adjacent to the cantilever beam stabilizer 140 and the spring 210, such that the telescopic end thereof is coupled to the bottom surface of the cantilever beam 135 and its telescopic end is affixed to the top surface 175 via the beam stiffener mount 150.

The beam stiffener 145 is preferably electronically operable by the occupant from inside the cockpit 110. In other embodiments, the beam stiffener 145 is autonomously operable such that the beam stiffener 145 operates automatically when the cockpit 110 dips below the forward line of sight of the occupant. In some embodiments, the beam stiffener 145 provides telescopic linkage between the cantilever beam 135 and the beam stiffener mount 150.

A spring 210 is preferably coupled to the spring mount 185 and the cantilever beam 135 and positioned proximate to the second end 220. The spring 210 is aligned with the beam stiffener 145. The spring 210 is preferably a shock absorber commonly found within vehicle suspension systems known in the art. In some embodiments, the spring 210 has ride-height control that allows the occupant to vary the ride height or ground clearance of the cockpit 110. In other embodiments, the spring 210 is self-leveling where the spring 210 maintains a constant ride height of the cockpit 110 above the snowmobile tunnel, regardless of load. In other embodiments, the spring 210 is replaceable by the occupant with a rigid frame or structure to, for example, accommodate for heavier occupants or to maintain a minimum height for forward visibility.

Figure 9:
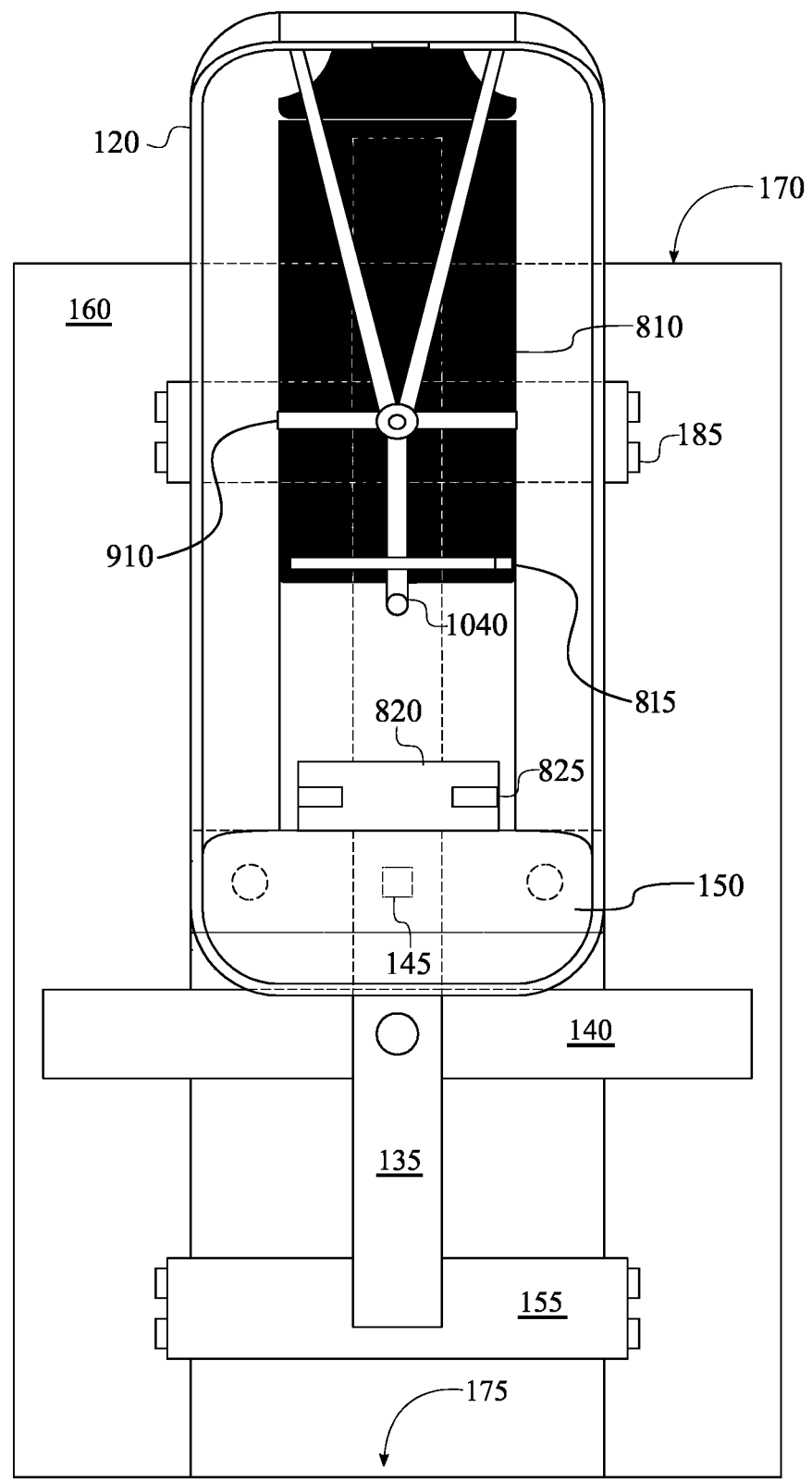
FIG. 9 illustrates a top view of the vehicular apparatus according to still other embodiments.
Figure 10:
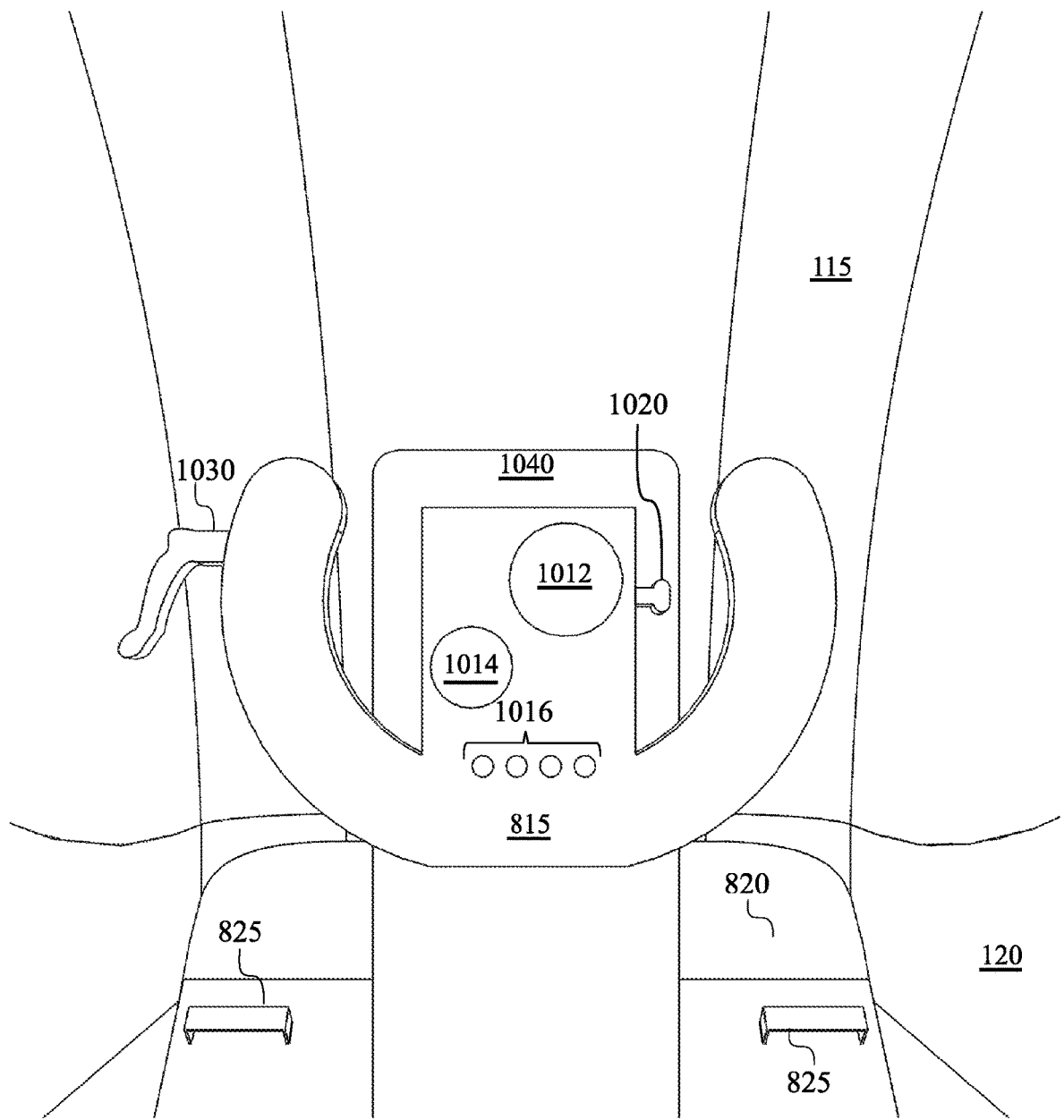
FIG. 10 illustrates a point-of-view perspective from within the cockpit of the vehicular apparatus according to certain embodiments.

FIG. 9 illustrates a top view of the pod 100 according to certain embodiments. Here, the canopy 115 is not depicted to allow one to view the inside of the body 120. FIG. 10 illustrates a point-of-view perspective from within the cockpit 110 according to other embodiments. Here, the canopy 115 is not depicted in the figure to facilitate the viewing of the interior of the cockpit 110. A steering wheel 815 is coupled to a console 1040, which is securely affixed to the floor of the cockpit 110 proximate to the seat 810. A footrest 820, which includes stirrups 825, is preferentially positioned proximate to the front of the body 120 proximate to the cantilever beam stabilizer 140. The steering wheel 815 preferably controls the snowmobile (not shown) via using electrical and/or electro-mechanical systems (i.e. drive-by-wire technology) as opposed to using conventional mechanical linkages.

Not to be constrained by theory, applicable drive-by-wire technologies include wiring solutions that facilitate the mounting and demounting of the cockpit 110 to the cantilever beam 135. In general, the steering wheel 815 can be of any shape, type or kind; and/or include any feature, material, orientation, component, or arrangement of components that would facilitate fulfillment of the objectives and intents of the instant disclosure. To be sure, available space within the cockpit 110 is limited and should be conserved as much as possible to provide the occupant with sufficient room to maneuver their body during operation of the snowmobile. As such, components included within the cockpit 110 are preferably selected based on their functionality and size to save space therein. Steering wheel 815 preferably has an overall U-shape to minimize the space occupied by the components within the cockpit. The overall shape of the steering wheel 815 allows for maximum forward visibility of the user during operation of the snowmobile.

In certain embodiments, the steering wheel 815 be telescopic and/or adjustable (e.g., vertically and/or horizontally) to facilitate ingress in and egress from the cockpit 110. In other embodiments, the steering wheel 815 includes a display screens 1012 and 1014 and one or more elements 1016. In certain embodiments, the elements 1016 can include, but are not limited to, indicator lights, switches, and/or dials. In addition to the aforementioned features, the steering wheel 815 preferably include a plurality of ergonomically positioned components to assist the user with their maneuvering tasks, including, but not limited to a thumb throttle lever 1020 and a hand brake lever 1030 incorporated therein.

An automatic engine kill switch can be incorporated into the pod detachment mechanism to ensure that the engine and drive train, namely the snowmobile track, does not inadvertently produce over-revolution which causes the snowmobile track to dangerously rapid spin during pod detachment. It can be preferred that the cockpit 110 comprise a simply designed, secured steering wheel mount or console. For example, unlike conventional vehicle consoles, this console serves only the purpose of providing a strong, secure mount for the steering wheel.

Although the disclosure has been explained in relation to its preferred embodiment, it is to be understood that many other possible modifications and variations can be made without departing from the spirit and scope of the disclosure.

What is claimed is:

1. An omega flex sway pod vehicular apparatus, comprising:
   a cockpit;
   a cantilever beam comprising a first end and a second end;
   a cantilever beam stabilizer centrally coupled to the cantilever beam proximate to the first end;
   a beam stiffener
      coupled to a beam stiffener mount and the cantilever beam and positioned proximate to the cantilever beam stabilizer;
   a spring coupled to a spring mount and the cantilever beam and positioned proximate to the second end and;
   wherein
      the cockpit is a hollowed, ovoid shaped structure
      the first end is coupled to a cantilever beam mount,
      a body is demountably coupled to the second end;
      the beam stiffener mount is coupled to a snowmobile tunnel;
      the snowmobile tunnel comprises a top side, a bottom side, a front side and a back side;
      the cantilever beam mount is coupled to the snowmobile tunnel;
      the spring mount is coupled to the snowmobile tunnel;
      the cantilever beam mount is positioned proximate to the front side;
      the spring mount is positioned proximate to the back side;
      the cantilever beam stabilizer is positioned perpendicular to the cantilever beam; and
      the cantilever beam is positioned centrally and longitudinally relative to the top side of the snowmobile tunnel.

2. The vehicular apparatus of claim 1, wherein
   the cockpit comprises:
      the body; and
      a canopy pivotably affixed to the body; and
      the body is transparent and thereby allows an occupant to view the snowmobile tunnel from within the cockpit.

3. The vehicular apparatus of claim 2, wherein the cockpit comprises a steering wheel; and the steering wheel comprises a thumb throttle lever and a brake lever.

4. The vehicular apparatus of claim 3, wherein the cockpit comprises a seat that provides a thigh-body angle of at least 150 degrees.

5. The vehicular apparatus of claim 4, wherein the cockpit comprises a footrest; and the footrest is substantially level with a bottom of the seat.

6. The vehicular apparatus of claim 5, wherein the cockpit comprises a multi-point seat harness.

7. The vehicular apparatus of claim 6, wherein the beam stiffener provides telescopic linkage between the cantilever beam and the beam stiffener mount.

8. The vehicular apparatus of claim 7, wherein at least one of the canopy and the body comprise a polycarbonate.

9. An omega flex sway pod vehicular apparatus, comprising:
   a cockpit;
   a cantilever beam comprising a first end and a second end;
   a cantilever beam stabilizer centrally coupled to the cantilever beam proximate to the first end;
   a beam stiffener
      coupled to a beam stiffener mount and the cantilever beam and positioned proximate to the cantilever beam stabilizer;
   a spring coupled to a spring mount and the cantilever beam and positioned proximate to the second end and;
   wherein
      the cockpit is a hollowed, ovoid shaped structure
      the first end is coupled to a cantilever beam mount,
      a body is demountably coupled to the second end;
      the beam stiffener mount is coupled to a snowmobile tunnel;
      the snowmobile tunnel comprises a top side, a bottom side, a front side and a back side;
      the cantilever beam mount is coupled to the snowmobile tunnel;
      the spring mount is coupled to the snowmobile tunnel;
      the cantilever beam mount is positioned proximate to the front side;
      the spring mount is positioned proximate to the back side;

the cantilever beam stabilizer is positioned perpendicular to the cantilever beam;

the cantilever beam is positioned centrally and longitudinally relative to the top side of the snowmobile tunnel;

the cockpit comprises the body and a canopy pivotably affixed to the body; and the body is transparent and thereby allows an occupant to view the snowmobile tunnel from within the cockpit.

10. The vehicular apparatus of claim 9, wherein the cockpit comprises a steering wheel; and the steering wheel comprises:
a thumb throttle lever; and
a brake lever.

11. The vehicular apparatus of claim 9, wherein the cockpit comprises a seat that provides a thigh-body angle of at least 150 degrees.

12. The vehicular apparatus of claim 9, wherein the cockpit comprises a footrest; and the footrest is substantially level with a bottom of the seat.

13. The vehicular apparatus of claim 9, wherein the cockpit comprises a multi-point seat harness.

14. The vehicular apparatus of claim 9, wherein the beam stiffener provides telescopic linkage between the cantilever beam and the beam stiffener mount.

15. The vehicular apparatus of claim 9, wherein at least one of the canopy and the body comprise a polycarbonate.

16. An omega flex sway pod vehicular apparatus, comprising:
a cockpit;
a cantilever beam comprising a first end and a second end;
a cantilever beam stabilizer centrally coupled to the cantilever beam proximate to the first end;
a beam stiffener coupled to a beam stiffener mount and the cantilever beam and positioned proximate to the cantilever beam stabilizer;
a spring coupled to a spring mount and the cantilever beam and positioned proximate to the second end; and wherein
the cockpit is a hollowed, ovoid like shaped structure
the first end is coupled to a cantilever beam mount,
a body is demountably coupled to the second end;
the beam stiffener mount is coupled to a snowmobile tunnel;
the snowmobile tunnel comprises a top side, a bottom side, a front side and a back side;
the cantilever beam mount is coupled to the snowmobile tunnel;
the spring mount is coupled to the snowmobile tunnel;
the cantilever beam mount is positioned proximate to the front side;
the spring mount is positioned proximate to the back side;
the cantilever beam stabilizer is positioned perpendicular to the cantilever beam;
the cantilever beam is positioned centrally and longitudinally relative to the top side of the snowmobile tunnel;
the cockpit comprises a steering wheel; and
the steering wheel comprises a thumb throttle lever and a brake lever.

17. The vehicular apparatus of claim 16, wherein the cockpit comprises:
the body;
a canopy pivotably affixed to the body; and
the body is transparent and thereby allows an occupant to view the snowmobile tunnel from within the cockpit.

18. The vehicular apparatus of claim 17, wherein the cockpit comprises a seat that provides a thigh-body angle of at least 150 degrees.

19. The vehicular apparatus of claim 18, wherein the beam stiffener provides telescopic linkage between the cantilever beam and the beam stiffener mount.

20. The vehicular apparatus of claim 19, wherein at least one of the canopy and the body comprise a polycarbonate.

* * * * *